(12) United States Patent
Smentek et al.

(10) Patent No.: US 8,904,223 B2
(45) Date of Patent: Dec. 2, 2014

(54) COMMUNICATION BETWEEN DOMAINS OF A PROCESSOR OPERATING ON DIFFERENT CLOCK SIGNALS

(75) Inventors: David Richard Smentek, Cupertino, CA (US); Manling Yang, Sunnyvale, CA (US)

(73) Assignee: Oracle International Corporation, Redwood City, CA (US)

( * ) Notice: Subject to any disclaimer, the term of this patent is extended or adjusted under 35 U.S.C. 154(b) by 349 days.

(21) Appl. No.: 13/523,444

(22) Filed: Jun. 14, 2012

(65) Prior Publication Data

US 2013/0339778 A1    Dec. 19, 2013

(51) Int. Cl.
*G06F 1/04*       (2006.01)
*G06F 5/06*       (2006.01)

(52) U.S. Cl.
USPC .......................................... 713/600; 713/400

(58) Field of Classification Search
CPC ....................................................... G06F 5/06
See application file for complete search history.

(56) References Cited

U.S. PATENT DOCUMENTS

| 2010/0131784 A1 | 5/2010 | Petrick | |
| 2011/0202788 A1* | 8/2011 | Hesse et al. | 713/600 |
| 2013/0251006 A1* | 9/2013 | Maji et al. | 375/219 |

* cited by examiner

*Primary Examiner* — Mark Connolly
*Assistant Examiner* — Joshua Neveln
(74) *Attorney, Agent, or Firm* — Polsinelli PC (57) ABSTRACT

Implementations of the present disclosure involve an apparatus and/or method for communicating between domains of a computing system, where at least one of the domains operates on a skipped clock signal. Communication from a skipped clock domain to a non-skipped clock domain, or free running domain, may include a valid signal component configured to indicate when a new data packet is available and one or more counters associated with the domains to count received data packets for acknowledgement or credit purposes. The free running domain may receive data packets from any number of skipped clock domains through the communication scheme described herein. Communication from a free running domain to a skipped clock domain may include delaying transmitted data packets to correspond with the cycles of the skipped clock signal to ensure that transmitted data packets arrive at the skipped clock domain to be properly read on a skipped clock cycle.

20 Claims, 7 Drawing Sheets

COMMUNICATION BETWEEN DOMAINS OF A PROCESSOR OPERATING ON DIFFERENT CLOCK SIGNALS

FIELD OF THE DISCLOSURE

Aspects of the present disclosure relate to computing systems and, more particularly, aspects of the present disclosure involve an apparatus and method for communicating between logical domains of a processor or computing system that operate on separate or different clock signals.

BACKGROUND

Electronic devices are ubiquitous in society and can be found in everything from cell phones to computers. The complexity and sophistication of these electronic devices usually increases with each generation. For example, newer microprocessors often have higher operating frequencies than previous generations of microprocessors. As a result of the increased operating frequencies, newer generations of microprocessors may consume more power than previous generations of microprocessors.

In addition to the increased operating frequency potentially causing increased power consumption, this increased operating frequency also may cause a growing disparity between the speed that a computer's microprocessor operates at versus the computer's memory access speed. Because of this disparity, computers with high speed microprocessors may spend a large amount of time waiting for memory references to complete instead of performing computational operations. In addition, some microprocessors may attempt to execute multiple threads of program code concurrently to offset this downtime. Notwithstanding the increase in throughput of the program code that comes with multithreading, there still remains a need for providing methods and apparatuses that conserve power in single core or multi-core processors Several techniques have been developed to address this increase in consumption of power of microprocessors. One such technique developed is to reduce the frequency in one or more cores of the microprocessor. In general, active power of a microprocessor is proportional to the operating frequency, i.e. reducing the number of clock edges seen by logic components in a microprocessor core reduces the active power consumed by the core. To reduce the operating frequency, sometimes referred to herein as "clock signal", of a core, the microprocessor may introduce a clock skipping signal to the system clock signal to create a skip clock pattern. The clock skip pattern is periodic over some number of cycles, but functionally operates at a lower frequency than the unskipped, or free-running, clock signal. Thus, a core where a skipped clock signal is provided may consume less power than a core operating on a free running clock signal.

Other techniques to reduce the operating frequency may also be implemented in a microprocessor. For example, many microprocessors now incorporate dynamic voltage frequency scaling (DVFS) that is applied to one or more cores of the processor to reduce the power consumed by the microprocessor. In general, DVFS techniques adjust the operating voltage and/or the clock frequency at which the different cores of the microprocessor operate such that those cores consume less power. The scaling of the operating frequency of the one or more cores to a lower frequency may occur in response to the microprocessor detecting a lower processing requirement for the one or more cores.

As a result of the clock frequency reducing techniques described above, cores of a microprocessor may be operating at varying clock frequencies or on varying clock. For example, a first core may operate on a skipped clock signal, while a second core of the same microprocessor may operate on a free running clock signal. The operation of the cores of a microprocessor at varying frequencies often introduces synchronization issues for communication between programs being executed by the cores of the microprocessor and between the microprocessor and other components of a computer system. For example, data packets may be transmitted to a core or component operating on a skipped clock signal when the core is otherwise unable to read the transmitted packet, such as during a skipped clock cycle.

It is with these and other issues in mind that various aspects of the present disclosure were developed.

SUMMARY

One implementation of the present disclosure may take the form of a method for communicating between domains of a processor. The method includes the operations of transmitting a first data packet from a first domain of a processor to a second domain of the processor, wherein the first domain utilizes a first timing signal comprising one or more skipped clock cycles, transitioning between a first value and a second value of a valid packet indicating signal upon transmission of the first data packet and monitoring the valid packet indicating signal to detect a transition from the first value to the second value. The method also includes the operations of inputting the first data packet in the second domain, wherein the second domain utilizes a second timing signal, incrementing a first counter associated with the second domain to indicate receipt of the first data packet and updating a second counter associated with the first domain based on the first counter. Through these operations, the processor can communicate between domains that operate on the separate clock signals.

Another implementation of the present disclosure may take the form of a processor. The processor includes a plurality of cores comprising one or more interface circuits, an interface logic coupled to the plurality of cores and comprising an acknowledgement counter configured to increment upon receipt of a data packet from a first core of the plurality of cores and a clock control unit coupled to the interface logic and the one or more interface circuits, the clock control unit configured to provide a clock signal to the interface logic and the one or more interface circuits and one or more clock skip symbols to the one or more interface circuits. During operation of the processor, a first data packet is transmitted from the first core of the plurality of cores to the interface logic, the first core operating on a first timing signal comprising the clock signal and a first clock skip symbol to create a timing signal with skipped clock cycles and the interface logic operating on the clock signal. In addition, the interface logic is configured to monitor a valid packet indicating signal to detect a transition from a first value to a second value and, upon detection of a transition of the valid packet indicating signal, input the first data packet and increment the acknowledgement counter and to transmit a second data packet to the first core of the plurality of cores, the transmission of the second data packet corresponding to a clock cycle of the first timing signal comprising one or more skipped clock cycles Yet another implementation of the present disclosure may take the form of a computer system. The computer system may include an input unit and a multi-core processor coupled to the input unit. The multi-core processor may include a plurality of cores comprising one or more interface circuits, a crossbar coupled to the plurality of cores and a clock control unit coupled to the crossbar and the one or more interface circuits, the clock control unit configured to provide a clock signal to the crossbar and the one or more interface circuits and one or more clock skip symbols to the one or more interface circuits. During operation of the computer system, a first data packet is transmitted from the first core of the plurality of cores to the crossbar, the first core operating on a first timing signal comprising the clock signal and a first clock skip symbol to create a timing signal with skipped clock cycles and the crossbar operating on the clock signal. Additionally, the crossbar may be configured to monitor a valid packet indicating signal to detect a transition from a first value to a second value and, upon detection of a transition of the valid packet indicating signal, input the first data packet and to transmit a second data packet to the first core of the plurality of cores, the transmission of the second data packet corresponding to a clock cycle of the first timing signal comprising one or more skipped clock cycles.

DETAILED DESCRIPTION

Implementations of the present disclosure involve an apparatus and/or method for communicating between domains of a computing system, where at least one of the domains operates on a skipped clock signal. In one particular embodiment, the computing system is a microprocessor device. A domain of the microprocessor may be a skipped clock domain to provide power savings to the processor by reducing the effective operating frequency of the domain. Communication from a skipped clock domain to a non-skipped clock domain, or free running domain, may include a valid signal component configured to indicate when a new data packet is available and one or more counters associated with the domains to count received data packets for acknowledgement or credit purposes. The free running domain may receive data packets from any number of skipped clock domains through the communication scheme described herein. Communication from a free running domain to a skipped clock domain may include delaying transmitted data packets to correspond with the cycles of the skipped clock signal to ensure that transmitted data packets arrive at the skipped clock domain to be properly read on a skipped clock cycle.

Figure 1:
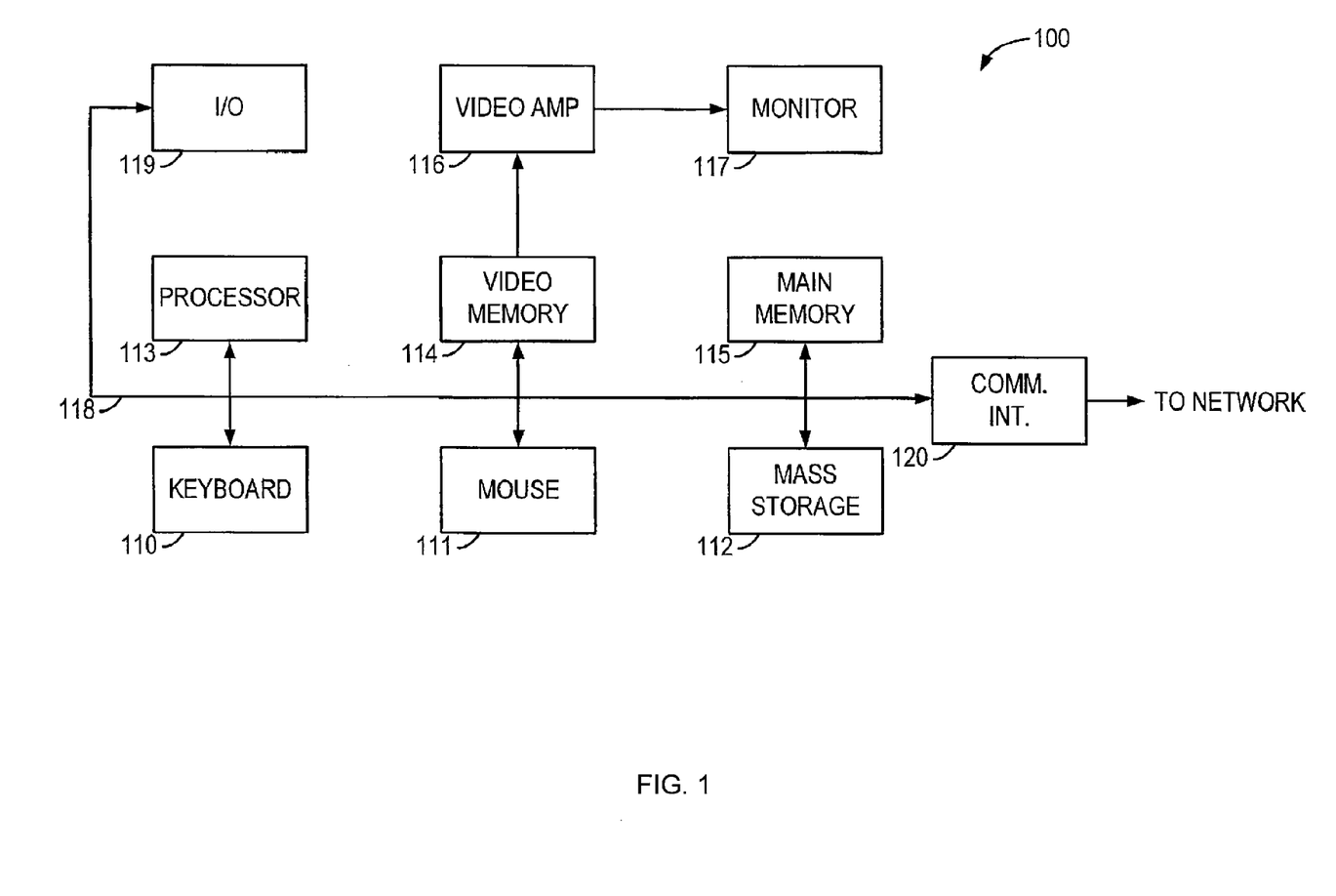
FIG. 1 is a block diagram illustrating an example of a computing system which may be used in implementing embodiments of the present disclosure.

FIG. 1 illustrates an exemplary computer system 100 capable of implementing the methods and operations described in this disclose. In some embodiments, the computer system 100 may be an implementation of enterprise level computers, such as one or more blade-type servers within an enterprise. In other embodiments, the computer system 100 may be a personal computer and/or a handheld electronic device. A keyboard 110 and mouse 111 may be coupled to the computer system 100 via a system bus 118. The keyboard 110 and the mouse 111, in one example, may introduce user input to the computer system 100 and communicate that user input to a processor 113. Other suitable input devices may be used in addition to, or in place of, the mouse 111 and the keyboard 110. An input/output unit 119 (I/O) coupled to system bus 118 represents such I/O elements as a printer, audio/video (A/V) I/O, etc.

Computer 100 also may include a video memory 114, a main memory 115 and a mass storage 112, all coupled to the system bus 118 along with the keyboard 110, the mouse 111 and the processor 113. The mass storage 112 may include both fixed and removable media, such as magnetic, optical or magnetic optical storage systems and any other available mass storage technology. The bus 118 may contain, for example, address lines for addressing the video memory 114 or the main memory 115. In some embodiments, the main memory 115 is a fully buffered dual inline memory module (FB-DIMM) that communicates serially with other system components.

The system bus 118 also may include a data bus for transferring data between and among the components, such as the processor 113, the main memory 115, the video memory 114 and the mass storage 112. The video memory 114 may be a dual-ported video random access memory. One port of the video memory 114, in one example, is coupled to a video amplifier 116, which is used to drive a monitor 117. The monitor 117 may be any type of monitor suitable for displaying graphic images, such as a cathode ray tube monitor (CRT), flat panel, or liquid crystal display (LCD) monitor or any other suitable data presentation device.

In some embodiments, the processor 113 is a SPARC® microprocessor from Sun Microsystems, Inc, although any other suitable microprocessor or microcomputer may be utilized. The processor 113 and its communication protocols in relation to power savings mechanisms employed by the processor are described in more detail below with regard to FIGS. 3-9.

The computer system 100 also may include a communication interface 120 coupled to the bus 118. The communication interface 120 provides a two-way data communication coupling via a network link. For example, the communication interface 120 may be a local area network (LAN) card, or a cable modem, and/or wireless interface. In any such implementation, the communication interface 120 sends and receives electrical, electromagnetic or optical signals which carry digital data streams representing various types of information.

Code received by the computer system 100 may be executed by the processor 113 as it is received, and/or stored in the mass storage 112, or other non-volatile storage for later execution. In this manner, the computer system 100 may obtain program code in a variety of forms. Program code may be embodied in any form of computer program product such as a medium configured to store or transport computer readable code or data, or in which computer readable code or data may be embedded. Examples of computer program products include CD-ROM discs, ROM cards, floppy disks, magnetic tapes, computer hard drives, servers on a network, and solid state memory devices.

Figure 2:
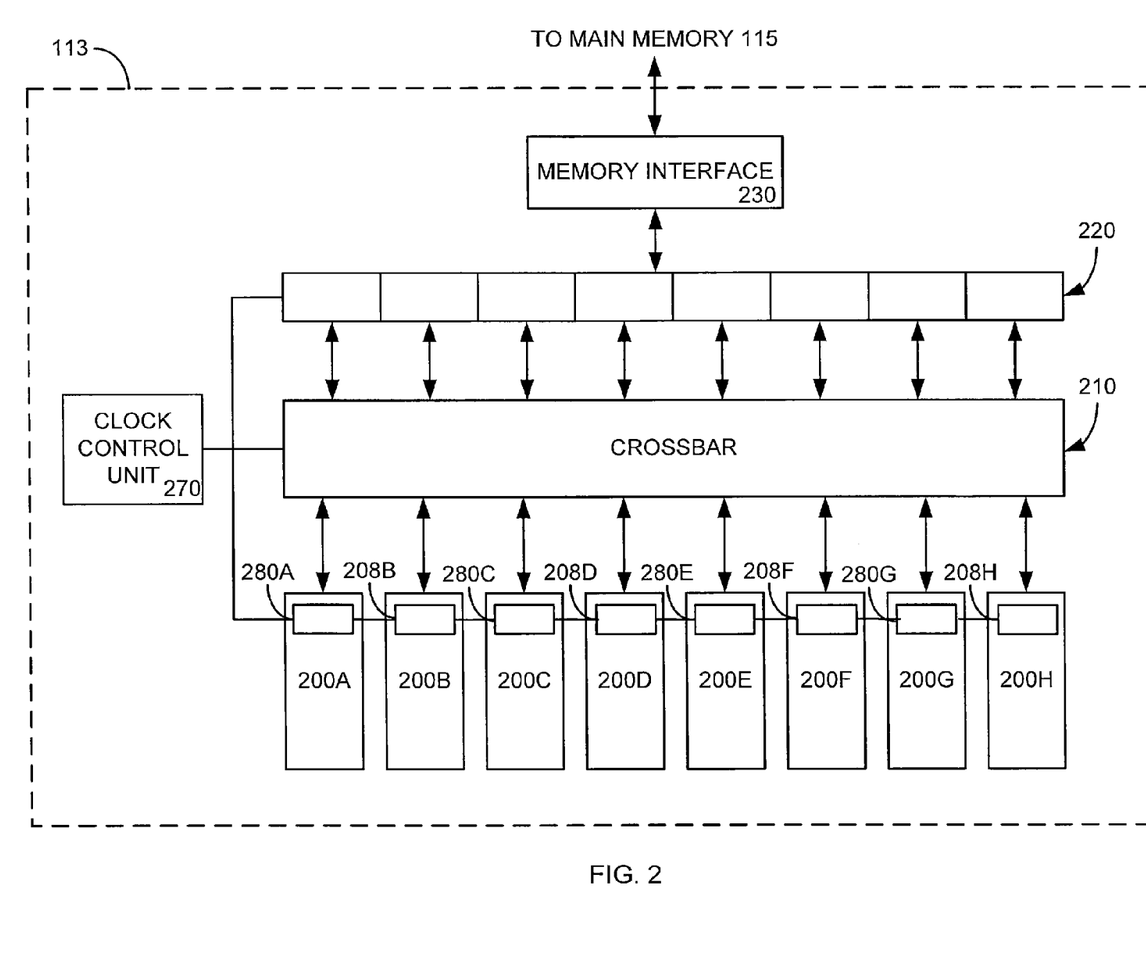
FIG. 2 is a circuit diagram illustrating the utilization of a reference clock of a computing system to provide a constant frequency timer for use by the microprocessor that has a varying core clock signal.

FIG. 2 illustrates an exemplary implementation of the processor 113 of the system of FIG. 1 that may be capable of implementing one or more of the communication schemes described herein for processors operating in a low power mode. In general, the communication scheme and operations described herein may be utilized by any type of computing system that communicates between domains that operate on separate clock signals. However, for simplicity, the embodiments of the present disclosure are discussed herein with reference to a microprocessor that includes domains operating on separate clock signals.

As shown, the processor 113 may include a plurality of processor cores 200A-H. Each of the cores 200A-H may couple to a high-level memory device, such as an outer level cache 220, via an interconnect network 210. For example, in one embodiment the outer level cache 220 is an L3 cache and the interconnect network 210 is a crossbar. In other embodiments, the outer level cache 220 may be any type of a shared memory device. Similarly, the interconnect network 210 may be any type of interconnect network, such as a ring or mesh interconnect network. For simplicity purposes only and not as a restriction to structure of the disclosed embodiments, the outer level cache 220 is referred to herein as "memory cache" and the interconnect network 210 is referred to herein as a "crossbar". However, one of ordinary skill in the art will recognize the additional structures and devices that may be included in different embodiments supporting the present disclosure. In addition, while the present disclosure discusses a multi-core processor, the embodiments described may also be utilized by a single core processor.

The memory cache 220 may couple to one or more memory interface(s) 230, which, in turn, may couple to one or more banks of main memory 115 (not specifically shown in FIG. 2). In some embodiments, the processor 113 may be implemented on a single integrated circuit. Furthermore, in some embodiments, the crossbar 210 and the memory cache 220 may be omitted, such as may be the case with a single core processor.

The cores 200A-H may be configured to execute instructions and to process data according to a particular instruction set architecture (ISA). As shown in FIG. 2, each of the cores 200A-H may be configured to operate independently of the others, such that all the cores 200A-H may execute code in parallel. Additionally, in some embodiments each of the cores 200A-H may be configured to execute multiple threads concurrently, where a given thread may include a set of instructions that may execute independent of instructions from another thread. For example, an individual software process executing on the computer system 100, such as an application, may consist of one or more threads that may be scheduled for execution by an operating system. In some implementations, each of the cores 200A-H may be configured to concurrently execute instructions from eight threads, for a total of 64 threads concurrently executing across the processor 113.

The crossbar 210 may be configured to manage data flow between the cores 200A-H and the shared cache 220. In some embodiments, the crossbar 210 may include logic (such as multiplexers or a switch fabric, for example) that may allow any core 200A-H to access any bank of memory cache 220, and that conversely may allow data to be returned from any memory bank to any core 200A-H. The crossbar 210 may be configured to concurrently process data requests from the cores 200A-H to the memory cache 220 as well as data responses from the memory cache 220 to the cores 200A-H. Further, as explained in more detail below, the crossbar 210 may coordinate communication between the cores 200A-H when the cores are operating under different clock signals.

The memory cache 220 may be configured to cache instructions and/or data for use by the cores 200A-H. As shown in FIG. 2, the memory cache 220 may be organized into multiple separately addressable banks that may each be independently accessed, such that in the absence of conflicts, each bank may concurrently return data to the core 200A-H requesting the data. In some embodiments, each individual bank may be implemented using set-associative or direct-mapped techniques. The memory cache 220 may be implemented in some embodiments as a writeback cache in which written (dirty) data may not be written to the main memory 115 until a corresponding cache line is evicted.

The memory interface 230 may be configured to manage the transfer of data between memory cache 220 and the main memory 115, for example in response to L3 fill requests and data evictions. In some embodiments, multiple instances of the memory interface 230 may be implemented, with each instance configured to control a respective bank of the main memory 115.

The timing or clock signals within the processor 113 may be provided with a clock control unit (CCU) 270. As shown in FIG. 2, the CCU 270 may be coupled to the cores 200A-H, the crossbar 210 and the L3 cache 220. Although this disclosure will focus on the CCU's 270 connection to the cores 200A-H and the crossbar 210, the CCU 270 may couple to other blocks within the processor 113. During operation, the CCU 270 may provide a plurality of timing or clock signals to the various blocks within the processor 113. Although the CCU 270 may be capable of providing multiple clock signals, the CCU 270 may provide a common clock signal to the cores 200A-H, the crossbar 210, and the memory cache 220 while providing separate non-core clock signals, or skipped clock signals, to the other blocks within the CCU 270.

The actual clock generation circuitry within the CCU 270 may take a variety of physical forms, including in some embodiments, a crystal based oscillator with relatively low phase noise and/or clock jitter. In other embodiments, the clock generation circuitry within the CCU 270 may be a frequency synthesized signal based on a crystal oscillator signal, such as a phase locked loop (PLL) synthesizer or a delay-locked-loop (DLL) synthesizer. Since the PLL and/or DLL are feedback and control loops that may synthesize a clock signal, there may be a predetermined period of time that elapses before for the PLL and/or DLL "lock" or provide a stable output clock signal to each of the blocks.

Regardless of the physical form of the circuitry that provides the clock signal, the clock signal may couple to one or more interface circuits, such as interface circuits 280A-H within the cores 200A-H. In some embodiments, the interface circuits 280A-H may be used to gate one or more of the clock signals from the CCU 270 and effectuate an overall reduction in the power consumption of the processor 113 during times of low activity by implementing a skipped clock signal.

To produce a skipped clock signal, a microprocessor may utilize the interface circuits 280A-H within the cores 200A-H to implement a skipped clock signal on one or more of the cores. In particular, the interface circuit 280A may include a shift register in communication with the CCU 270. During operation, the CCU 270 delivers the clock signal to the interface circuits 280A-H and may also deliver a clock skip symbol to one or more of the shift registers of the interface circuits. The clock skip symbol provided by the CCU 270 may comprise a plurality of bits that are used by the interface circuit 280A-H to produce a predetermined number and/or pattern of the clock signal. In general, the interface circuit 280A-H may logically combine the clock skip symbol with the clock signal to produce the skipped timing signal for use within the core 200A. Thus, by altering the constituent bits and/or pattern of the symbol, the timing signal provided to the core 200A also may be altered. Notably, this may occur without adjusting the frequency provided by the PLL or other clock generating circuitry, which may require re-locking the PLL. The application of the clock skipped symbol to the clock signal is discussed in more detail below with reference to FIG. 3.

In some embodiments, the header circuit 280A-H in the each of the cores 200A-H within the processor 113 may receive separate clock skip symbols. Thus, in some embodiments, the processor 113 may separately control the power state of each core individually. For example, the core 200A may receive a different symbol than the core 200B. As a result, in some embodiments, the power consumed by each of the cores 200A-H may be adjusted independently. Further, in some embodiments, other components of the processor 113, such as the crossbar 210 and the memory units 220 may operate on a clock signal that is different than the clock signal of the cores 200A-H.

Figure 3:
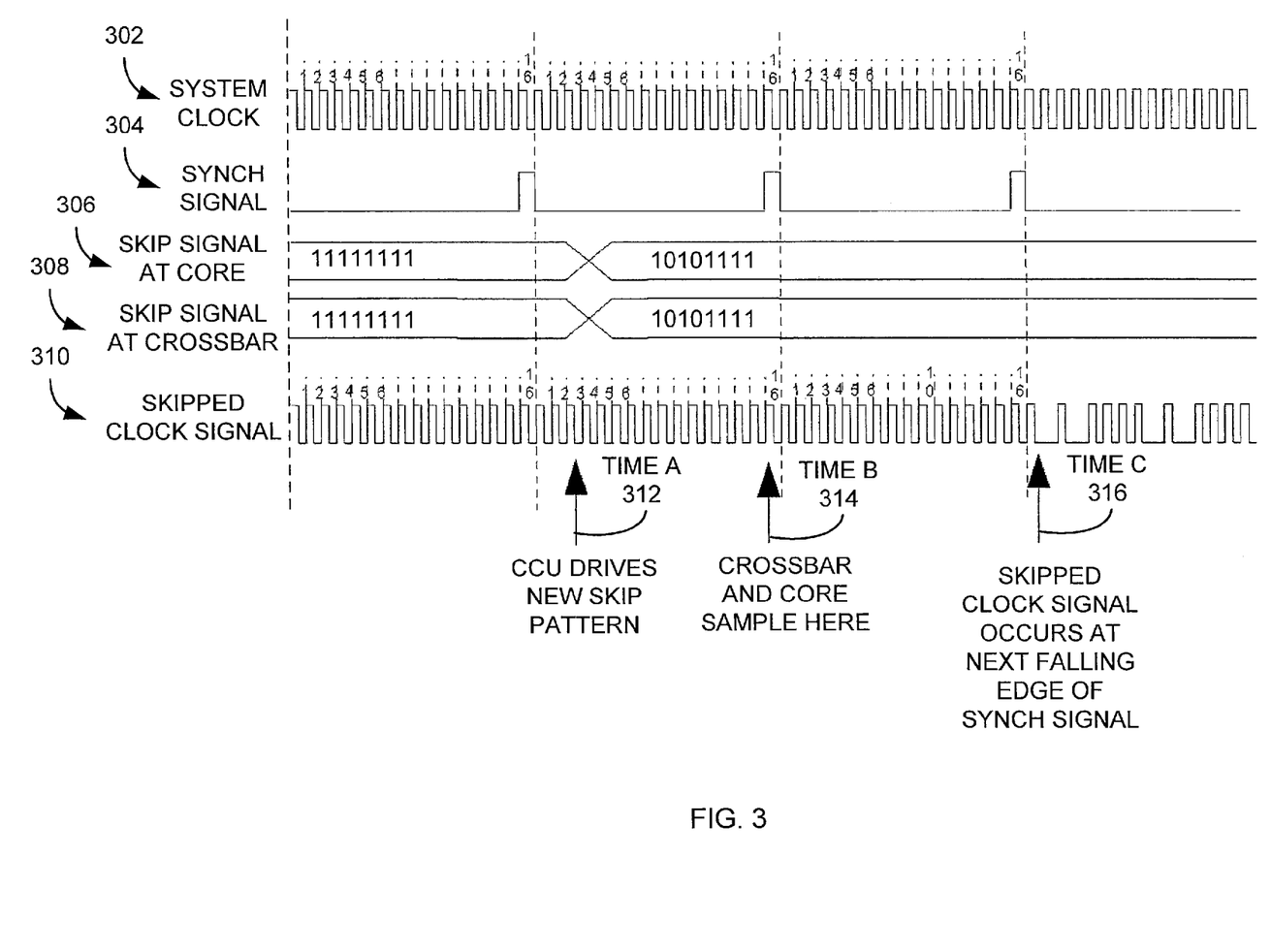
FIG. 3 is a timing diagram illustrating one method for implementing a skipped clock signal in a core of a processor.

FIG. 3 is a timing diagram illustrating the implementation of a skipped clock signal to a core of a processor. In particular, the timing diagram 300 includes a system clock signal 302, a synchronization signal 304, a skip symbol signal 306 consisting of a plurality of bits provided by the clock control unit 270 received at the core, a skip symbol signal 308 received at the crossbar and the skipped clock signal 310 that operates a core based on the skip symbol. Through the application of these signals to the various components of the processor 113 of FIG. 2, a skipped clock signal is applied to at least one core of the processor for power saving purposes.

The system clock signal 302 is a clock signal generated by the PLL of the processor 113 and has a generally constant frequency. In the embodiment illustrated in FIG. 3, the synchronization signal 304 is a signal that is asserted every 16 cycles of the system clock signal. In general, however, the synch signal 304 may be asserted to indicate any number of system clock cycles. Further, the synch signal 304 is typically received at each core of the processor 113, as well as the crossbar 210 and the memory devices 220. As mentioned, the clock control unit 270 may generate the skip symbol signals received at the core 306 and received at the crossbar 308. As shown in FIG. 3, the skip symbol at the beginning of the timing diagram is "11111111". In this particular embodiment, a high (or "1") digit of the skip symbol, when applied to the system clock signal 302, results in a replication of the system clock signal on the skipped clock signal 310 for that digit. Thus, as shown in the skipped clock signal 310, the skipped clock mirrors the system clock signal 302 when the skip symbol consists of all high digits.

At time A 312, the clock control unit ("CCU") 270 generates a new skip symbol and transmits the new skip symbol to at least one core (indicated on the skip signal at the core 306) and to the crossbar 210 (indicated on the skip signal at crossbar 308). As shown in the timing diagram 300, the new skip symbol transmitted by the CCU 270 consists of "10101111".

At time B 314, the crossbar 210 and the at least one core receiving the clock skip symbol sample the new skip symbol at the assertion of the synch signal 304 following the transmission of the new skip symbol. Additionally, to allow the one or more components of the processor 113 affected by the new skip signal to settle into the new skipped clock signal, the new skip symbol is applied to the clock signal 302 at the next falling edge of the synch signal 304 (time C 316) after the sampling at time B 314. At this time (time C 316), the new skip symbol is applied to the clock signal 302 by the interfacing circuit of the affected core or cores. As shown in skipped clock signal 310 at time C 316, a skipped clock signal is created that is a combination of the system clock signal 302 and the new skip symbol. More particularly, a low (or "0") digit of the skip symbol, when applied to the system clock signal 302, results in missed or skipped cycle of the system clock signal 302. In this particular example, the skipped clock signal 310 is a high-low-high-low-high-high-high-high sequence corresponding to the clock skip symbol. In this manner, a clock skip signal is created through the clock skip symbol provided by the CCU 270 and applied by the interface circuits 208A-H.

As mentioned above, the processor 113 may separately control the clock signal to each core individually. For example, the core 200A may receive a different symbol than the core 200B. However, because the cores are operating on distinct clock signals, communication between a first core and a second core, as well as between the cores and the other components of the processor 113 may be difficult. For example, several messages sent from core 200A operating on a fast clock intended for core 200B may arrive before the clock operating core 200B has an opportunity to receive and clock in the messages. Thus, messages between cores that operate on separate clock signals may be lost such that operation of the processor 113 is degraded or ceases.

Figure 4A:
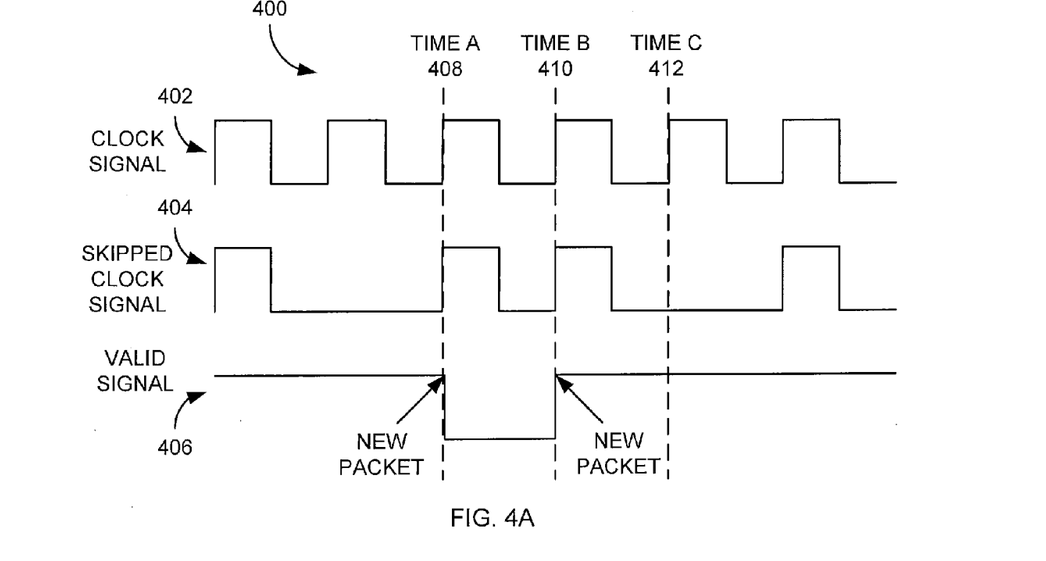
FIG. 4A is a timing diagram illustrating a communication method from a domain operating on a skipped clock of a processor to a domain operating on a free running system clock.
Figure 4B:
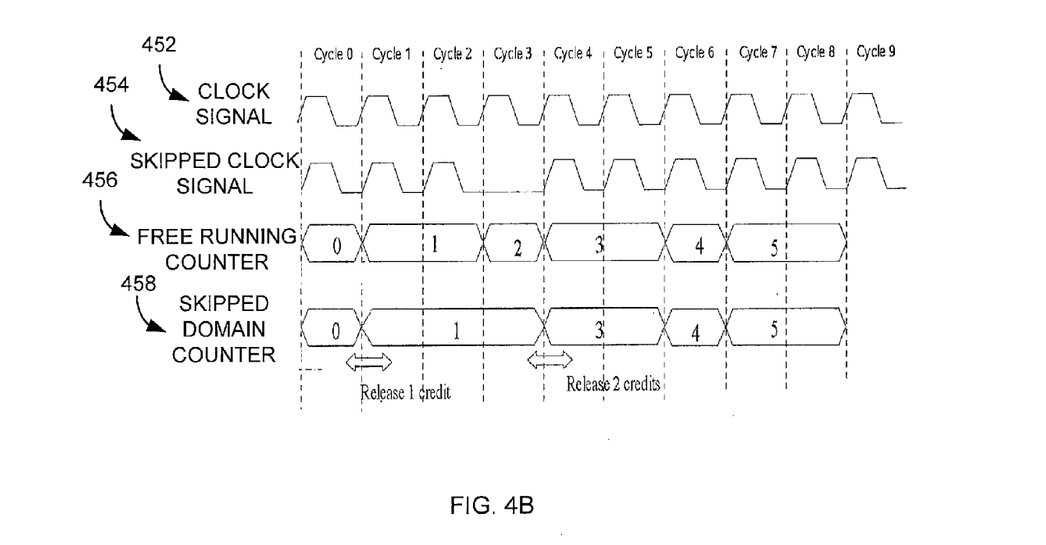
FIG. 4B is a timing diagram illustrating a communication method with an acknowledgement of a received message from a domain operating on a skipped clock of a processor to a domain operating on a free running system clock.
Figure 5:
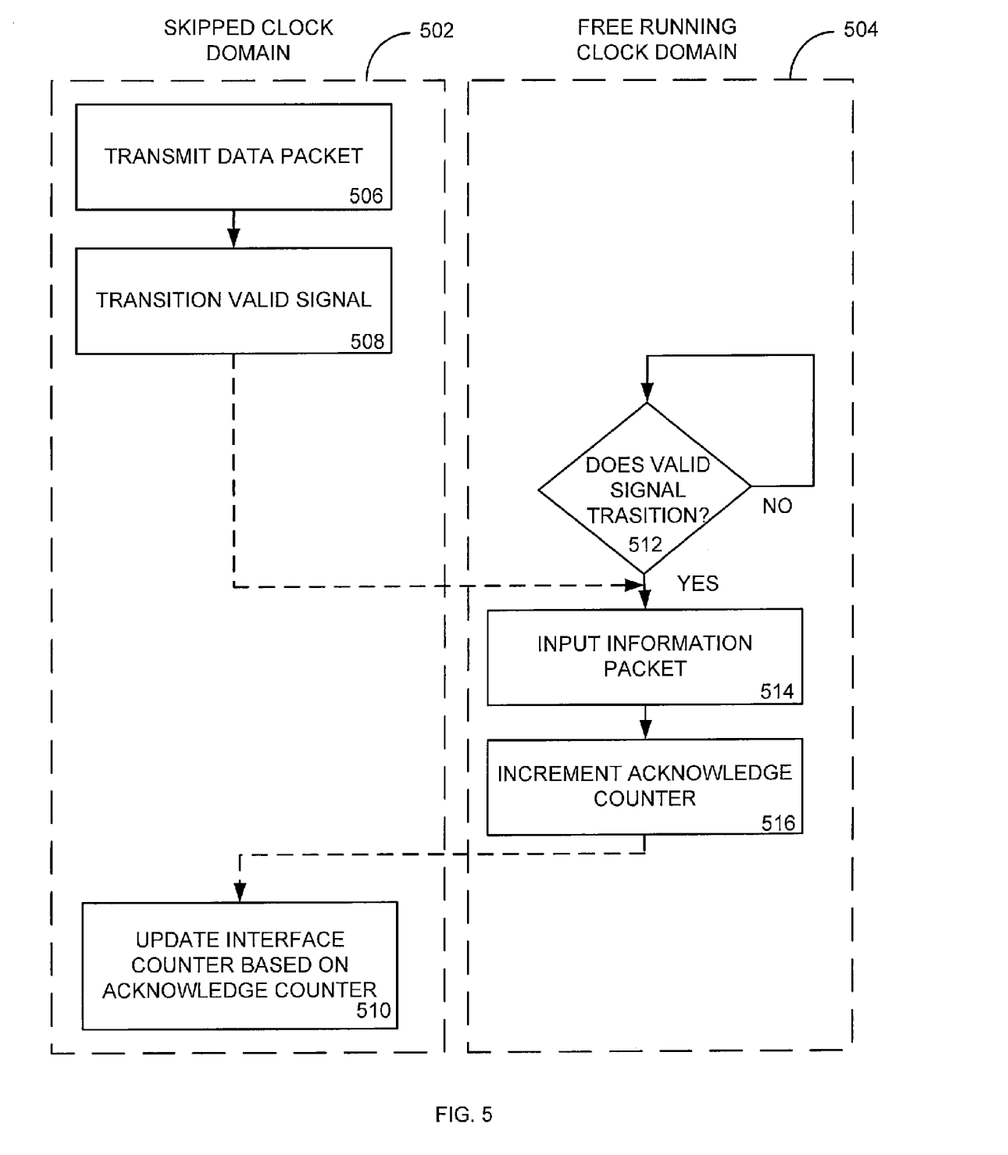
FIG. 5 is a flowchart illustrating one embodiment of a processor for communicating from a skipped clock domain of the processor to a free running domain.

One embodiment for communications from a domain operating on a skipped clock to a component or domain operating on a free running (or system clock) signal is presented in the timing diagrams of FIG. 4A and FIG. 4B and the flowchart of FIG. 5. In particular, FIG. 4A is a timing diagram illustrating a communication method from a domain operating on a skipped clock of a processor to a domain operating on a free running system clock utilizing a valid signal to indicate transmission of a new data packet. FIG. 4B is a timing diagram illustrating a communication method with an acknowledgement of a received message from a domain operating on a skipped clock of a processor to a domain operating on a free running system clock. FIG. 5 is a flowchart illustrating one embodiment of a processor for communicating from a skipped clock domain of the processor to a free running domain. It should be appreciated that the embodiments discussed herein may apply to any communication from a skipped clock domain of a processor 113 to a free running domain. Further, the skipped clock domain and free running domain may include any number of components of the processor. For example, the skipped clock domain may include a core 200A of the processor and the free running domain may include the crossbar 210 of the processor. In another example, the skipped clock domain may include a first core 200A and the free running clock domain may include a second core 200B.

Beginning in FIG. 4A, the timing diagram 400 illustrates one embodiment for communicating from a skipped clock domain to a free running or unskipped domain of the processor utilizing a valid signal to indicate transmission of a new data packet. The timing diagram 400 illustrates a system clock signal 402 on which the free running domain is operating. The diagram 400 also includes an exemplary skipped clock signal 404 on which a skipped clock domain of the processor is operating. For example, one or more cores of the processor may operate under the skipped clock signal 404 for power saving purposes. Further, the skipped clock signal 404 of FIG. 4A is but one example of a skipped clock signal of the processor. In general, the embodiment illustrated in FIG. 4A may operate with any type of skipped clock signal based on a clock signal 402. In addition, the timing diagram 400 includes a valid signal 406 that may accompany a communication from the skipped clock domain to signal or otherwise indicate when a new data packet of information is available, as explained in more detail below.

In general, communication from the skipped clock domain includes one or more data packets and a valid signal 406. The valid signal 406 may take many forms. For example, the data packet may include an indicator bit associated with a data packet that indicates the state of the valid signal 406. In another embodiment, the valid, signal 406 is an indicator signal separate from the data packet that is transmitted to the receiving component to notify the receiving domain that a new data packet is transmitted.

In either embodiment, a transition on the valid signal 406 indicates to the receiving domain that a new data packet is transmitted by the skipped domain. Thus, contrary to a typical valid signal where a high or "1" on the signal indicates a new packet and a low or "0" on the signal indicates no new packet, any transition from active to inactive or inactive to active on the valid signal 406 of the embodiment shown in FIG. 4A indicates a new data packet transmitted from the skipped domain. Such an encoding of the valid signal 406 ensures that a valid data packet is not seen or read twice by a free running or receiving domain if a skipped clock cycle is encountered immediately after sending the data packet.

For example, with reference to the timing diagram 400 of FIG. 4A, the skipped clock domain transmits a data packet at time A 408. Also at time A 408, the valid signal 406 is transitioned from a high to a low value. This transition indicates that a new data packet is supplied by the skipped clock domain and can be read as a new packet at the receiving domain. In addition, a data packet is also transmitted from the skipped clock domain at time B 410. Again, a transition of the valid signal 406 from a low to a high value at time B 410 indicates the new data packet.

At time C 412, however, no new data packet is sent from the skipped clock domain as no clock cycle is present on the skipped clock signal 404 at time C. Further, the skipped clock domain cannot transition the valid signal 406 at time C 412 since no clock cycle is present on the skipped clock signal 404. Thus, the valid signal 406 remains a high value at time C 412, even though no new data packet is sent by the skipped clock domain. A high value on a traditional valid signal would indicate that a new packet of information is transmitted by the skipped clock domain such that the free running domain, operating on the system clock that has a clock cycle at time C 412, would re-read the data packet sent by the skipped clock domain at time B 410, resulting in an error. In this embodiment, however, the free running domain determines that no transition on the valid signal 406 occurs at time C 412 such that, even though the value on the valid signal is high, the data packet is not read at time C. In this manner, the valid signal 406 facilitates proper transmission of communications from the skipped clock domain to a free running domain.

In some instances, an acknowledgement of receipt of a communication, or credit, is provided by a receiving domain during communication between domains. In the present embodiment where a skipped domain transmits data packets to a free running domain, acknowledgements may be counted using one or more counters that may be accessed or otherwise read by the skipped clock domain to determine the number of properly received packets. For example, FIG. 4B is a timing diagram 450 illustrating a communication method with an acknowledgement of a received message from a domain operating on a free running system clock to a domain operating on a free running system clock. Similar to the above timing diagrams, the diagram 450 of FIG. 4B includes a system clock signal 452 (which operates a free running domain of the processor) and a skipped clock signal 454 (which operates a skipped clock domain of the processor). Also similar to the above diagrams, the skipped clock signal 454 is but one example of a skipped clock signal and other skipped clock signals may be used in conjunction with the embodiments described herein.

The timing diagram 450 of FIG. 4B also includes a free running counter signal 456 that illustrates a counter associated with the receiving or free running domain to count the received data packets sent by the skipped domain. The counter 456 associated with the free running domain increments by one upon receipt of a valid data packet from the skipped clock domain. Based on the information contained in the counter 456, the skipped clock domain may determine that a sent data packet was properly received by the free running domain. As such, the counter 456 associated with the free running domain may include enough bits to account for received data packets during a particular amount of time. For example, the counter 456 may be a 3-bit counter to count up to eight received data packets. However, the counter 456 associated with the skipped clock domain may be any length to count any number of received packets. Further, the counter 456 may be implemented using one or more hardware components, such as logic gates, one or more software programs or a combination of hardware and software.

As shown in the timing diagram 450, the counter 456 associated with the free running domain increments at clock cycle 1, clock cycle 3, clock cycle 4, clock cycle 6 and clock cycle 7, indicating that an data packet was received by the free running domain from the skipped clock domain. Also shown in the timing diagram 450 is a counter 458 associated with a skipped clock domain. The counter 458 associated with the skipped clock domain may be similar to the counter 456 of the free running domain to track the packets received by the free running domain from the skipped clock domain. In particular and explained in more detail below, the counter 458 of the skipped clock domain may access or otherwise communicate with the counter 456 of the free running domain to determine the number of packets received.

The counters 456, 458 of the free running domain and the skipped clock domain operate to maintain an accurate count of the number of packets received by the free running domain. For example, in traditional communication schemes, an acknowledgment message is transmitted back to the sending domain when a packet is received at a receiving domain. However, such acknowledgement messages may be missed by a skipped clock domain if the acknowledgement message arrives when a clock cycle is skipped by the skipped clock domain. To ensure that each acknowledgement is accounted for, one embodiment of the processor may utilize the counters described above. More particularly and as shown in FIG. 4B, the skipped clock signal 454 skips a clock signal at clock cycle 3. However, at clock cycle 3, the free running counter receives a data packet (as indicated by the increment of the counter 456 from "1" to "2") and, traditionally, would transmit an acknowledgement message that would be missed by the skipped clock domain. To correct the missed acknowledgement, the skipped clock domain may simply access or otherwise communicate with the free running counter 456 to determine if any packets were received during the skipped clock cycle. Thus, at clock cycle 4, the skipped domain counter 458 may increment by two values, or release two credits, to account for the packet received at the free running domain during the skipped clock cycle. In this manner, acknowledgement messages or credits may be accounted for when communicating from a skipped clock domain to a free running domain, even during skipped clock cycles of a skipped clock signal 454.

FIG. 5 is a flowchart illustrating one embodiment of a processor for communicating from a skipped clock domain of the processor to a free running domain. The operations of the FIG. 5 may be performed by the processor and, in particular, by a skipped clock domain and a free running domain of the processor. In some embodiments, however, the operations of FIG. 5 may be performed by hardware components of the processor and/or one or more software programs. As such, FIG. 5 illustrates those operations that may be performed by the skipped clock domain 502 and the free running clock domain 504. The operations of FIG. 5 are similar to the operations of the domains described above with reference to FIGS. 4A and 4B.

Beginning in operation 506, the skipped clock domain transmits a data packet intended for the free running domain. In addition, at operation 508, the skipped clock domain transitions the valid signal, either from high to low or low to high. As explained above, a transition on the valid signal indicates that a new data packet has been sent. Thus, in operation 512, the free running clock domain 504 determines when a transition on the valid signal occurs. If a transition does not occur, the free running clock domain 504 continues to monitor for the transition. Once the transition occurs indicating that a packet is transmitted, the free running clock domain 504 inputs or reads the available data packet in operation 514 and increments the acknowledge counter in operation 516. The acknowledge counter is similar to the free running counter signal 456 described above in relation to FIG. 4B. As also described above, the skipped clock domain updates an interface counter associated with the skipped clock domain based on the acknowledge counter in operation 510. In general, the updating of the interface counter occurs on the next clock cycle of the skipped clock signal.

As should be appreciated, communication from the skipped clock domain to the free running domain may occur without the free running domain being aware of the skipped clock signal pattern. In other words, the communication appears to the free running clock domain as though the skipped clock domain is not operating on a skipped clock signal. Further, the communication may occur through any change to the clock skip behavior of the skipped clock domain, providing robustness in power saving techniques applied to the processor. Further still, because the free running domain does not need to be aware of the skipped clock signal for the skipped clock domain, communication from several skipped clock domains, operating on different skipped clock signals, may occur between the several clock skip domains and the free running clock domain. In this manner, a free running clock domain, such as the crossbar, may receive packets from any number of skipped clock domains and operate as a central communication arbiter between the skipped clock domains.

Figure 6A:
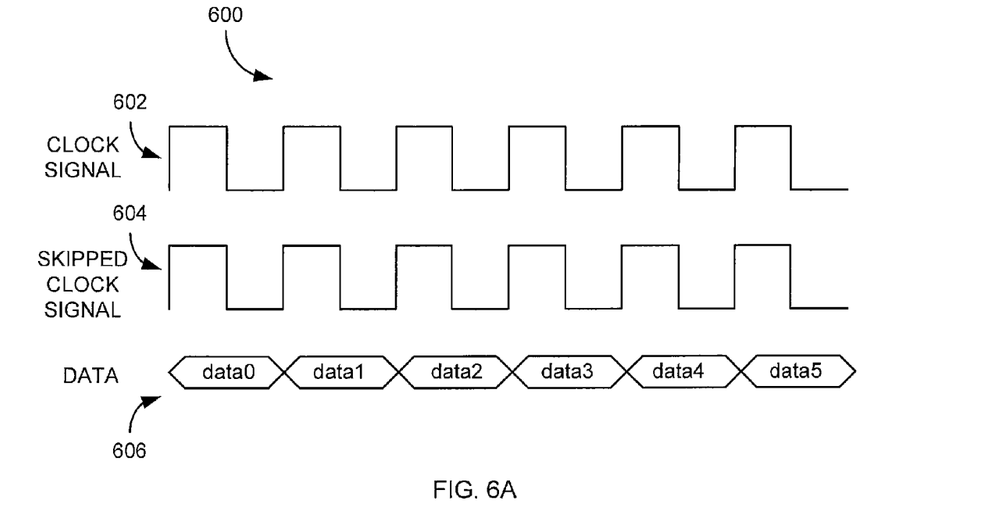
FIG. 6A is a timing diagram illustrating a communication method from a free running domain of a processor to a domain operating on a skipped clock that mirrors a clock signal.
Figure 6B:
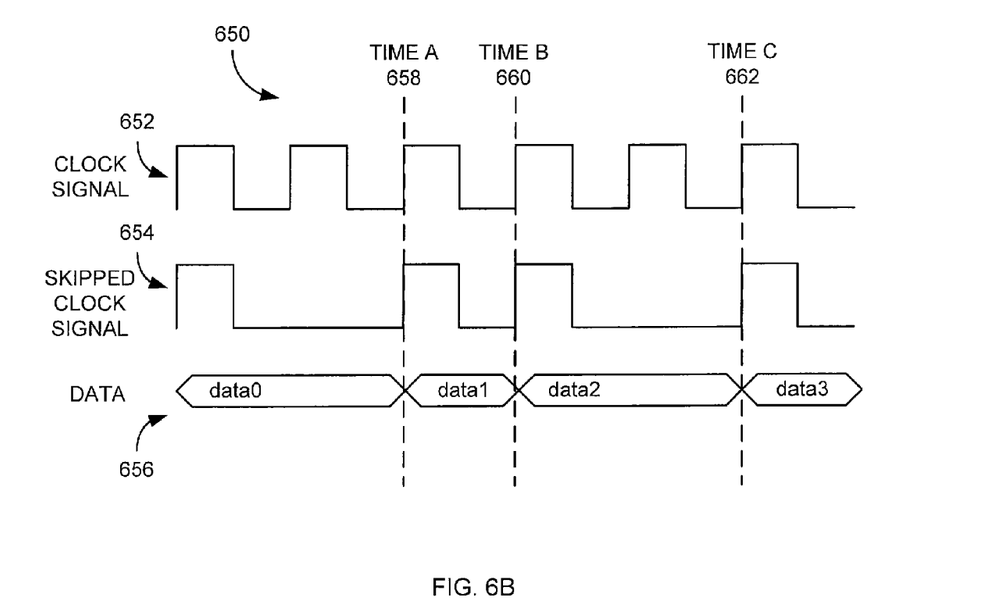
FIG. 6B is a timing diagram illustrating a communication method from a free running domain of a processor to a domain operating on a skipped clock that includes skipped clock cycles.
Figure 7:
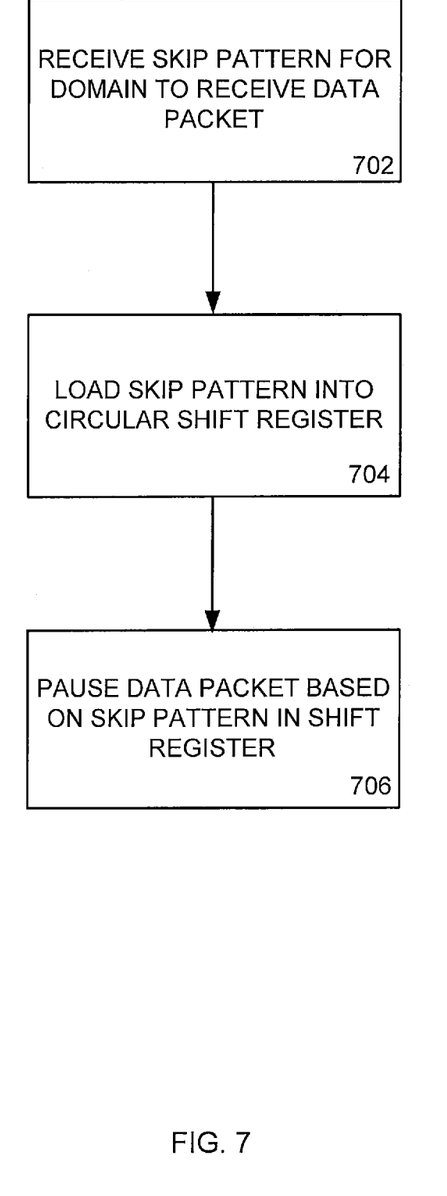
FIG. 7 is a flowchart illustrating one embodiment of a processor for communicating from a free running clock domain of the processor to a skipped clock domain.

The embodiments discussed above with reference to FIGS. 4A-5 provide a communication scheme for a skipped clock domain to communicate with a free running domain. To communicate from a free running domain to a skipped clock domain, a processor may utilize a communication scheme such as that illustrated in FIGS. 6A through 7. In particular, FIG. 6A is a timing diagram illustrating a communication method from a free running domain of a processor to a domain operating on a skipped clock that mirrors the clock signal. FIG. 6B is a timing diagram illustrating a communication method from a free running domain of a processor to a domain operating on a skipped clock that includes skipped clock cycles. FIG. 7 is a flowchart illustrating one embodiment of a processor for communicating from a free running clock domain of the processor to a skipped clock domain.

To ensure that data packets transmitted from a free running domain are properly received by a skipped clock domain, the processor may be configured or otherwise perform operations to transmit the data packets to the skipped clock domain that corresponds with the skipped clock signal. For example, timing diagram 600 of FIG. 6A illustrates the transmission of data packets 606 to a skipped clock domain. In particular, the timing diagram 600 includes a clock signal 602 that operates a free running domain of the processor, a skipped clock signal 604 that operates a skipped clock domain of the processor and a data packet signal 606. In this particular example, the skipped clock signal 604 mirrors the clock signal 602 such that no clock cycles are skipped. Thus, as shown, the data packets 606 transmitted to the skipped clock domain arrive at each clock cycle of the skipped clock signal 604 and may be properly read by the skipped clock domain on each clock cycle.

In contrast, the timing diagram 650 of FIG. 6B illustrates the transmission of data packets to a skipped clock domain operating on a skipped clock signal that includes skipped clock cycles. The timing diagram 650 includes a clock signal 652 that operates a free running domain of the processor, a skipped clock signal 654 that operates a skipped clock domain of the processor and a data packet signal 656. As shown, the data packets 656 are transmitted to the skipped clock domain to correspond with the clock cycles of the skipped clock signal 654. Thus, data packet "data0" arrives on the first clock cycle of the skipped clock signal 654 while data packet "data1" arrives at time A 658. It should be noted that time A 658 corresponds to the second clock cycle of the skipped clock signal 654 and the third cycle of the clock signal 652. Thus, a data packet provided by the free running domain at the second cycle of the clock signal 652 to the skipped clock domain would be missed by the skipped clock domain since no cycle of the skipped clock signal 654 occurs at that time. As further shown, data packet "data2" is transmitted at time B 660 and data packet "data3" is transmitted at time C 662. In this manner, the processor may be configured to transmit the data packets 656 intended for a skipped clock domain to correspond to the cycles of the skipped clock signal 654 such that the data packets are not missed by a skipped clock cycle of the skipped clock domain.

To ensure that the data packets transmitted from the free running domain arrive at the skipped clock domain on the skipped clock cycles, the processor 113 may perform one or more of the operations of FIG. 7. In particular, the operations of the FIG. 7 may be performed by a free running domain and/or a skipped clock domain of the processor. In addition, the operations may be implemented using hardware, such as logic gates, software or a combination of hardware and software.

Beginning in operation 702, one or more of the components of the processor may receive the skip pattern symbol of a skipped clock domain to which a data packet is intended. For example, as explained above, a clock control unit 270 may provide one or more clock skip symbols to the components of the processor to implement a skipped clock signal. Thus, in addition to providing the clock skip symbol to the domain, such as a core 200A, that operates on the skipped clock signal, the clock skip symbol may also be transmitted to the free running domain portion of the processor for receipt in operation 702. As should be appreciated, a free running domain of a processor 113 may communicate with several skipped clock domains that operate on different skipped clock signals. In this example, the clock skip symbol for each skipped clock domain that communicates with the free running domain may be received in operation 702.

In operation 704, the received clock skip symbol or symbols are loaded into a circular shift register device associated with the skipped clock domains. More particularly, a circular shift register device may be associated with each skipped clock domain that communicates with the free running domain. The clock skip symbol for a particular skipped clock domain is then loaded into the shift register device associated with that particular skipped clock domain in operation 704. In one embodiment, the circular shift register device is connected to or otherwise associated with the interface circuit for a particular core that is clock skipped for storage of the clock skip symbol for that core. In another embodiment, the clock skip symbol is associated in a table or database with the skipped clock domain. As discussed below, the clock skip symbol may be utilized by the free running domain when transmitting data packets to the skipped clock domain.

Utilizing the stored skip clock symbol for a particular skipped clock domain, the transmitted data packet may be paused based in part on the skip clock symbol in operation 706. In other words, the processor 113 may be aware of the skipped clock signal that operates a skipped clock domain and pause the transmitted data packets to align with the clock cycles of the skipped clock signal. Returning to FIG. 6, the processor 113 may utilize the stored skip clock symbol to align the data packets 656 to arrive at the skipped clock domain at the skipped clock cycles, namely time A 658, time B 660 and time C 662. In general, the circular shift register is utilized by the processor 113 to qualify the advancement of data into the skipped clock domain. In another embodiment, a software program may delay the transmission of a data packet based on the stored skip clock signal. In this manner, the free running domain transmits data packets to the skipped clock domains such that each data packet arrives on a skipped clock cycle for each skipped clock domain. Further, the free running domain may communicate with several skipped clock domains utilizing the operations in FIG. 5.

In addition to pausing the data packets based on the stored skip clock symbol, the processor 113 may also maintain a static delay for transmission of a data packet from the free running domain to a skipped clock domain. For example, based on the distance between the free running domain and the skipped clock domain and the number of components between the domains, a delay in transmission of data from the free running domain to the skipped clock domain may be present. The processor 113, in operation 706, may include the transmission delay in calculating the shift or pause applied to the transmitted data packet.

Further, receipt of the skip clock symbol in operation 702 should occur with enough time to allow the processor 113 to store the skip clock symbol before transmission of a data packet to the skipped clock domain. In general, an arrival of the skip clock symbol a few clock cycles provides enough time to store the skip clock symbol in the circular shift register associated with the skipped clock domain.

It should be noted that the flowcharts of FIGS. 5 and 7 are illustrative only. Alternative embodiments of the present invention may add operations, omit operations, or change the order of operations without affecting the spirit and scope of the present invention.

The foregoing merely illustrates the principles of the invention. Various modifications and alterations to the described embodiments will be apparent to those skilled in the art in view of the teachings herein. It will thus be appreciated that those skilled in the art will be able to devise numerous systems, arrangements and methods which, although not explicitly shown or described herein, embody the principles of the invention and are thus within the spirit and scope of the present invention. From the above description and drawings, it will be understood by those of ordinary skill in the art that the particular embodiments shown and described are for purposes of illustrations only and are not intended to limit the scope of the present invention. References to details of particular embodiments are not intended to limit the scope of the invention.

What is claimed is:

1. A method for communicating between domains of a processor, the method comprising:
    transmitting a first data packet from a first domain of a processor to a second domain of the processor, wherein the first domain utilizes a first timing signal comprising one or more skipped clock cycles;
    transitioning between a first value and a second value of a valid packet indicating signal upon transmission of the first data packet;
    monitoring the valid packet indicating signal to detect a transition from the first value to the second value;
    inputting the first data packet in the second domain, wherein the second domain utilizes a second timing signal;
    incrementing a first counter associated with the second domain to indicate receipt of the first data packet; and
    updating a second counter associated with the first domain based on the first counter.

2. The method of claim 1 wherein the first value of the valid packet indicating signal is a low value and the second value of the valid packet indicating signal is a high value.

3. The method of claim 1 wherein the first value of the valid packet indicating signal is a high value and the second value of the valid packet indicating signal is a low value.

4. The method of claim 1 wherein the updating operation occurs on a first positive edge of the first timing signal following a skipped clock cycle of the one or more skipped clock cycles, the updating operation comprising loading a value stored in the first counter into the second counter.

5. The method of claim 1 further comprising:
    transmitting a second data packet from the second domain of the processor to the first domain of the processor, the transmission of the second data packet corresponding to a clock cycle of the first timing signal comprising one or more skipped clock cycles.

6. The method of claim 5 wherein the transmitting a second data packet operation comprises:
    loading a clock skip symbol into a shift register, the symbol comprising a plurality of bits corresponding to the first timing signal comprising one or more skipped clock cycles; and
    shifting the clock skip symbol out of the shift register; and
    timing the transmission of the second data packet based on at least the clock skip symbol.

7. The method of claim 6 wherein the timing operation comprises delaying the transmission of the second data packet based on characteristics of a transmission path between the first domain and the second domain.

8. The method of claim 5 further comprising:
transmitting a third data packet from a third domain of the processor to the second domain of the processor, wherein the third domain utilizes a third timing signal comprising a skipped clock sequence that is different than the first timing signal.

9. The method of claim 1 wherein the first domain is a first core of a multi-core processor and the second domain is a second core of the multi-core processor.

10. The method of claim 1 wherein the first domain is a core of the processor and the second domain is an interface circuit of the processor.

11. A processor comprising:
a plurality of cores, wherein each core comprises one or more interface circuits;
an interface logic coupled to the plurality of cores and comprising an acknowledgement counter configured to increment upon receipt of a data packet from a first core of the plurality of cores; and
a clock control unit coupled to the interface logic and the one or more interface circuits, the clock control unit configured to provide a clock signal to the interface logic and the one or more interface circuits and one or more clock skip symbols to the one or more interface circuits;
wherein a first data packet is transmitted from the first core of the plurality of cores to the interface logic, the first core operating on a first timing signal comprising the clock signal and a first clock skip symbol to create a timing signal with skipped clock cycles and the interface logic operating on the clock signal;
wherein the interface logic is configured to monitor a valid packet indicating signal to detect a transition from a first value to a second value and, upon detection of a transition of the valid packet indicating signal, input the first data packet and increment the acknowledgement counter; and
wherein the interface logic is further configured to transmit a second data packet to the first core of the plurality of cores, the transmission of the second data packet corresponding to a clock cycle of the first timing signal comprising one or more skipped clock cycles.

12. The processor of claim 11 further comprising:
an interface counter associated with the first core, wherein the first core is configured to retrieve a value in the acknowledgement counter and stored the retrieved value in the interface counter.

13. The processor of claim 11 wherein the interface logic is further configured to:
receive and store the first clock skip symbol in a shift register, the first clock skip symbol comprising a plurality of bits corresponding to the first timing signal; and
shift the clock skip symbol out of the shift register; and
time the transmission of the second data packet based on at least the clock skip symbol by shifting the clock skip symbol out of the shift register.

14. The processor of claim 13 wherein the interface logic is further configured to delay the transmission of the second data packet based on characteristics of a transmission path between the interface logic and the first core.

15. The processor of claim 11 wherein the first core is configured to transition the valid packet indicating signal between the first value and the second value.

16. The processor of claim 11 wherein a second core of the plurality of cores is configured to transmit a third data packet from the second core to the interface logic, wherein the second core utilizes a second timing signal that is different than the first timing signal.

17. A computer system, comprising:
an input unit;
a multi-core processor coupled to the input unit, the processor comprising:
a plurality of cores, wherein each core comprises one or more interface circuits;
a crossbar coupled to the plurality of cores; and
a clock control unit coupled to the crossbar and the one or more interface circuits, the clock control unit configured to provide a clock signal to the crossbar and the one or more interface circuits and one or more clock skip symbols to the one or more interface circuits;
wherein a first data packet is transmitted from the first core of the plurality of cores to the crossbar, the first core operating on a first timing signal comprising the clock signal and a first clock skip symbol to create a timing signal with skipped clock cycles and the crossbar operating on the clock signal;
wherein the crossbar is configured to monitor a valid packet indicating signal to detect a transition from a first value to a second value and, upon detection of a transition of the valid packet indicating signal, input the first data packet; and
wherein the crossbar is further configured to transmit a second data packet to the first core of the plurality of cores, the transmission of the second data packet corresponding to a clock cycle of the first timing signal comprising one or more skipped clock cycles.

18. The computer system of claim 17 further comprising:
a first counter associated with the crossbar wherein the crossbar is configured to increment the first counter upon receipt of the data packet from the first core of the plurality of cores; and
a second counter associated with the first core wherein the first core is configured to access a value stored in the first counter and store the accessed value in the second counter.

19. The computer system of claim 18 wherein the crossbar is further configured to:
receive and store the first clock skip symbol in a shift register, the first clock skip symbol comprising a plurality of bits corresponding to the first timing signal; and
shift the clock skip symbol out of the shift register; and
time the transmission of the second data packet based on at least the clock skip symbol by shifting the clock skip symbol out of the shift register.

20. The computer system of claim 17 wherein a second core of the plurality of cores is configured to transmit a third data packet from the second core to the crossbar, wherein the second core utilizes a second timing signal that is different than the first timing signal.

* * * * *

UNITED STATES PATENT AND TRADEMARK OFFICE
CERTIFICATE OF CORRECTION

PATENT NO. : 8,904,223 B2  
APPLICATION NO. : 13/523444  
DATED : December 2, 2014  
INVENTOR(S) : Smentek et al.

Page 1 of 1

It is certified that error appears in the above-identified patent and that said Letters Patent is hereby corrected as shown below:

In the Specification

In column 1, line 37, delete "processors" and insert -- processors. --, therefor.

In column 2, line 61, delete "cycles" and insert -- cycles. --, therefor.

Signed and Sealed this  
Eleventh Day of August, 2015

Michelle K. Lee  
*Director of the United States Patent and Trademark Office*